United States Patent [19]

Cha et al.

[11] Patent Number: 4,680,135

[45] Date of Patent: Jul. 14, 1987

[54] CARBOXYLIC/SULFONIC POLYMER AND CARBOXYLIC/POLYALKYLENE OXIDE POLYMER ADMIXTURES FOR USE IN IRON OXIDE DEPOSIT CONTROL

[75] Inventors: Charles Y. Cha, McMurray; Richard G. Varsanik, Coraopolis, both of Pa.

[73] Assignee: Calgon Corporation, Pittsburgh, Pa.

[21] Appl. No.: 819,094

[22] Filed: Jan. 15, 1986

Related U.S. Application Data

[63] Continuation-in-part of Ser. No. 669,902, Nov. 9, 1984, abandoned.

[51] Int. Cl.$^4$ ................................................ C02F 5/10
[52] U.S. Cl. ..................................... 252/180; 252/175; 210/696; 210/698; 210/701
[58] Field of Search ................ 252/175, 180; 210/696, 210/698, 701; 526/240, 287

[56] References Cited

U.S. PATENT DOCUMENTS 3,928,196 12/1975 Persinski et al. .................... 252/180

FOREIGN PATENT DOCUMENTS 57-84794 5/1982 Japan .

Primary Examiner—Paul Lieberman
Assistant Examiner—Hoa V. Le
Attorney, Agent, or Firm—W. C. Mitchell; R. B. Olson; M. C. Sudol, Jr.

[57] ABSTRACT

The instant invention is directed to a process for inhibiting the formation and deposition of iron oxide in aqueous systems using at least 0.1 ppm of an admixture of:
(A) a water-soluble polymer having an intrinsic viscosity of 0.05 to 2.5 dl/g, prepared from:
  (i) 35 to 90%, by weight, of an unsaturated carboxylic acid, or its salt; and
  (ii) 10 to 65%, by weight, of an unsaturated sulfonic acid, or its salt; and
(B) a water-soluble polymer having an intrinsic viscosity of 0.05 to 2.5 dl/g, prepared from:
  (i) 35 to 90%, by weight, of an unsaturated carboxylic acid, or its salt; and
  (ii) 10 to 65%, by weight, of an unsaturated pendant polyalkylene oxide compound.

The instant invention is also directed to an admixture of:
(A) a water soluble polymer, having an intrinsic viscosity of 0.05 to 2.5 dl/g, prepared from:
  (i) 35 to 90%, by weight, of an unsaturated carboxylic compound selected from the group consisting of acrylic acid, methacrylic acid, their salts and mixtures thereof; and
  (ii) 10 to 65%, by weight, of an unsaturated sulfonic compound selected from the group consisting of 2-acrylamido-2-methylpropylsulfonic acid, 2-methacrylamido-2-methylpropyl sulfonic acid, their salts and mixtures thereof; and
(B) a water-soluble polymer having an intrinsic viscosity of 0.05 to 2.5 dl/g, prepared from:
  (i) 35 to 90%, by weight, of an unsaturated carboxylic acid, or its salt; and
  (ii) 10 to 65%, by weight, of an unsaturated pendant polyalkylene oxide compound.

1 Claim, No Drawings

CARBOXYLIC/SULFONIC POLYMER AND CARBOXYLIC/POLYALKYLENE OXIDE POLYMER ADMIXTURES FOR USE IN IRON OXIDE DEPOSIT CONTROL

BACKGROUND OF THE INVENTION

This application is a continuation-in-part of U.S. Ser. No. 669,902, filed Nov. 9, 1984, now abandoned.

U.S. Pat. No. 3,928,196 discloses the use of a copolymer of 2-acrylamido-2-methylpropylsulfonic acid and acrylic acid in inhibiting scale.

Japanese Pat. No. 57-84,794 discloses copolymers of acrylic acid and allyl polyethylene glycol as scale inhibitors.

Most industrial waters contain alkaline earth metal cations, such as calcium, barium, magnesium, etc. and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. Iron oxide particles in cooling water will increase precipitate formation. For example, when the concentrations of calcium ion and carbonate ion exceed the solubility of the calcium carbonate reaction products, a solid phase of calcium carbonate will form.

Solubility product concentrations are exceeded for various reasons, such as partial evaporation of the water phase, change in pH, pressure or temperature, and the introduction of iron oxide particles or additional ions which form insoluble compounds with the ions already present in the solution.

As these reaction products precipitate on surfaces of a water carrying system, they form scale or deposits. This accumulation prevents effective heat transfer, interferes with fluid flow, facilitates corrosive processes, and harbors bacteria. This scale is an expensive problem in many industrial water systems causing delays and shutdowns for cleaning and removal.

Scale-forming compounds can be prevented from precipitating by inactivating their cations with chelating or sequestering agents, so that the solubility of their reaction products is not exceeded. Generally, this requires large quantities of chelating or sequestering agent as cation, since chelation is a stoichiometric reaction, and these amounts are not always desirable or economical.

Almost 50 years ago, it was discovered that certain inorganic polyphosphates would prevent such precipitation when added in amounts far less than the concentrations needed for sequestering or chelating. By polyphosphates, we mean phosphates having a molar ratio of metal oxide: $P_2O_5$ between 1:1 and 2:1.

When a precipitation inhibitor is present in a potentially scale-forming system at a markedly lower concentration than that required for (stoichiometric) binding of the scale-forming cation, it is said to be present in "threshold" amounts. See for example, Hatch and Rice, "Industrial Engineering Chemistry", Vol. 31, pages 51 to 53 (January 1939); Reitemeier and Buehrer, "Journal of Physical Chemistry", Vol. 44, No. 5, pages 535 to 536 (May 1940); Fink and Richardson, U.S. Pat. No. 2,358,222; and Hatch, U.S. Pat. No. 2,539,305.

Generally, sequestering takes place at a weight ratio of threshold active compound to scale-forming cation components of greater than about 10:1, depending on the anion components in the water. Threshold inhibition generally takes place at a weight ratio of threshold active compound to scale-forming cation components of less than about 0.5:1.0.

Certain water soluble polymers, including groups derived from acrylamide and acrylic acid have been used to condition water containing scale-forming compounds. As for example, see U.S. Pat. Nos. 2,783,200; 3,514,476; 2,980,610; 3,285,886; 3,463,730 and 3,518,204.

DESCRIPTION OF THE INVENTION

The instant invention is directed to a process for inhibiting the formation and deposition of iron oxide in aqueous systems, comprising adding to the system at least 0.1 ppm of an admixture of:

(A) a water-soluble polymer having an intrinsic viscosity of 0.05 to 2.5 dl/g, prepared from:
  (i) 35 to 90%, by weight, of an unsaturated carboxylic acid, or its salt; and
  (ii) 10 to 65%, by weight, of an unsaturated sulfonic acid, or its salt; and (B) a water-soluble poymer having an intrinsic viscosity of 0.05 to 2.5 dl/g, prepared from:
  (i) 35 to 90%, by weight, of an unsaturated carboxylic acid, or its salt; and
  (ii) 10 to 65%, by weight, of an unsaturated pendant polyalkylene oxide compound, wherein the weight ratio of (A):(B) ranges from about 10:1 to about 1:10, preferably about 3:1 to about 1:3, and most preferably about 1:1.

The instant invention is also directed to an admixture of:

(A) a water soluble polymer, having an intrinsic viscosity of 0.05 to 2.5 dl/g, prepared from:
  (i) 35 to 90%, by weight, of an unsaturated carboxylic compound selected from the group consisting of acrylic acid, methacrylic acid, their salts and mixtures thereof; and
  (ii) 10 to 65%, by weight, of an unsaturated sulfonic compound selected from the group consisting of 2-acrylamido-2-methylpropylsulfonic acid, 2-methacrylamido-2-methylpropyl sulfonic acid, their salts and mixtures thereof; and (B) a water-soluble polymer having an intrinsic viscosity of 0.05 to 2.5 dl/g, prepared from:
  (i) 35 to 90%, by weight, of an unsaturated carboxylic acid, or its salt; and
  (ii) 10 to 65%, by weight, of an unsaturated pendant polyalkylene oxide compound, wherein the weight ratio of (A):(B) ranges from about 10:1 to about 1:10, preferably about 3:1 to about 1:3, and most preferably about 1:1.

These compositions are especially effective in the presence of calcium ions.

The phrase "inhibiting the formation and deposition" is meant to include threshold inhibition, dispersion, solubilization, or particle size reduction.

The word "scale" includes any scale forming in an aqueous solution. Examples include calcium carbonate, calcium sulphate, calcium phosphate, calcium phosphonate (including calcium hydroxyethylidene diphosphonic acid), calcium oxalate, barium sulphate, silica, alluvial deposits, metal oxide (including iron oxide), and metal hydroxide, (including magnesium hydroxide).

The phrase "aqueous system" is meant to include any system containing water; including, but not limited to, cooling water, boiler water, desalination, gas scrubbers, blast furnaces, sewage sludge thermal conditioning equipment, reverse osmosis, sugar evaporators, paper processing, mining circuits and the like.

Any unsaturated carboxylic acid or salt may be used to prepare the polymer. Examples include acrylic acid, methacrylic acid, α-halo acrylic acid, maleic acid, itaconic acid, vinyl acetic acid, allyl acetic acid, fumaric acid, β-carboxyethyl acrylate, their salts and mixtures thereof. The preferred carboxylic acids are acrylic acid, methacrylic acid, β-carboxyethylacrylate, maleic acid, fumaric acid itaconic acid, and their salts. The most preferred carboxylic acids are acrylic acid, methacrylic acid and their salts.

Any unsaturated sulfonic acid or salt may be used. Examples include 2-acrylamido-2-methylpropylsulfonic acid, 2-methacrylamido-2-methylpropylsulfonic acid, styrene sulfonic acid, vinyl sulfonic acid, sulfo alkyl acrylate or methacrylate, allyl sulfonic acid, methallyl sulfonic acid, 3-methacrylamido-2-hydroxy propyl sulfonic acid, sulfonic acid acrylate, their salts and mixtures thereof. The preferred sulfonic compounds are 2-acrylamido-2-methylpropylsulfonic acid, 2-methacrylamido-2-methylpropylsulfonic acid, allyl sulfonic acid, styrenesulfonic acid, vinylsulfonic acid and their salts. The most preferred sulfonic acids are 2-acrylamido-2-methylpropylsulfonic acid, 2-methacrylamido-2-methylpropylsulfonic acid and their salts.

Any unsaturated compound with pendant polyalkylene oxide groups may be used. Examples include allyl polyalkylene glycols, methallyl polyalkylene glycols, polyalkylene glycol acrylates, methoxy allyl polyalkylene glycols, and polyalkylene glycol methacrylates and their ether derivatives. The preferred compounds are methoxy allyl polyalkylene glycols and their ether derivatives. The most preferred compounds are methoxy allyl polyethylene glycols of the formula $$CH_2=CH-CH_2(OCH_2CH_2)_nOCH_3,$$

where n ranges from 5-10.

Mixtures of the various monomers may be used. Nonionic monomers (such as acrylamide, methacrylamide and acrylonitrile) may also be present in the polymers.

The (A) polymers of the instant invention are prepared from 35 to 90%, preferably 50-70%, by weight, of an unsaturated carboxylic acid or salt; and 10 to 65%, preferably 30 to 50%, by weight, an unsaturated sulfonic acid, or salt. The (B) polymers of the instant invention are prepared from 35 to 90%, preferably 50-70%, by weight, of an unsaturated carboxylic acid, or its salt; and 10 to 65%, perferably 30 to 50%, by weight, of an unsaturated, pendant polyalkylene oxide, compound.

The polymers may be prepared by mixing the monomers preferably in the presence of a free radical initiator. Any free radical initiator may be used. Examples include peroxides, azo initiators and redox systems. The polymerization may also be initiated photochemically. The preferred catalysts are sodium persulfate and sodium metabisulfite or a mixture of ammonium persulfate and any azo type initiator, such as 2,2'-azobis-(2,4-dimethyl-4-methoxyvaleronitrile).

The polymerization may be conducted by any of a variety of procedures, for example, in solution, suspension, bulk and emulsions.

The reaction temperature is not critical. The reaction will generally occur between 10 and 100° C. The reaction, depending on the temperature, generally takes from 5 minutes to 12 hours. Measuring for residual monomer will verify when the reaction is complete.

The pH of the reaction mixture is not critical. The pH is generally in the range of 3.0 to 9.0.

The percent solids in the reaction mixture is not critical. The preferred range is 1 to 50%, by weight, solids.

The polymers are usually identified by intrinsic viscosity. The intrinsic viscosity should be 0.05 to 2.5, preferable 0.05 to 0.5 dl/g, in 1.0 M sodium chloride (measured on a 75 Cannon Ubbelohde capillary viscometer).

The polymers of the instant invention are used in a minimum dosage of 0.1 ppm, preferably 0.1 to 100 ppm, most preferably 0.1 to 25 ppm.

EXAMPLES

The following abbreviations are used in the examples and are defined as indicated:

AA=acrylic acid.
AMPSA=2-acrylamido-2-methylpropylsulfonic acid. (AMPS is a registered trademark of Lubrizol Corporation.)
Methoxy Allyl PEG=$CH_2=CH-CH_2(OCH_2CH_2)_nOCH_3$, where n is 5 to 10.

Polymerization

The monomers were mixed in the ratios indicated in the Tables so as to make up 28% of the total solution weight. Sufficient amount of sodium hydroxide was added to neutralize the solution to pH 4.5. Sodium persulfate and sodium metabisulfite, as catalyst, were added to the neutralized monomer solution at 0.8 and 1.5 percent of the solution weight respectfully. The initiation temperature was 25° C. The polymerization was allowed to run to completion which usually took between 15 and 30 minutes at which time the reaction temperature had peaked between 80°-90° C.

Intrinsic viscosities were measured in 1 M NaCl in a size 75 Cannon Ubbelohde capillary viscometer. Measurements at 2.0, 1.0, and 0.5 g/dl were taken. The Huggins equation was used to determine the intrinsic viscosity.

Calcium Carbonate Inhibition

Calcium carbonate inhibition was determined by adding a given concentration of the polymers of the instant invention to a solution containing 200 mg/l $Ca^{+2}$ (as $CaCl_2$), 600 mg/l $HCO_3^{-1}$ (as $NaHCO_3$) at pH 8.0±0.1. The solution was stored in a stagnant flask for 24 hours at 60° C. (140° F.). Poor performing samples allow a precipitate of $CaCO_3$ to form. To remove these 'solids' the solution is filtered through a 2.5 micron filter. The inhibitor effectiveness under these conditions is obtained by determination of the soluble calcium content of the test solutions using the Schwarzenbach titration method (EDTA, chrome black T indicator). The soluble calcium ion concentration in the absence of inhibitor is equivalent to 0% scale inhibition. The percent inhibition for a given test is determined by:

$$\frac{Ve - Vo}{Vt - Vo} \times 100 = \% \text{ inhibition}$$

Vo=the Schwarzenbach titration volume with no inhibitor present (control)
Vt=the Schwarzenbach titration volume when no precipitation occurs $V_e$ = the experimental Schwarzenbach titration volume when inhibitors are present in the test solution

Calcium Phosphate Inhibition

Calcium phosphate inhibition was determined by adding a given concentration of the admixture of the instant invention to a solution containing 200 mg/l $Ca^{+2}$ (as $CaCl_2$) and 9 mg/l $PO_4^{-3}$ (as $Na_2HPO_4$). The solution is buffered at pH 8.5 by adding a 16.1% solution of $NaHCO_3:Na_2CO_3$. This solution was stored for 24 hours at 60° C. (140° F.). Poor performing samples allow $CaPO_4$ precipitation to occur so the stored solutions are filtered through 2.5 Σ filter paper to remove 'solids'. The inhibitor effectiveness under these conditions is obtained by determination of the soluble phosphate content of the test solution using a photometric method (ascorbic acid as indicator). The range of the test is about 0 to 1.6 mg/l phosphate when the color is measured in a 1-inch cell at a wavelength of 880 nm. Higher levels can be determined by: 1) diluting the sample; 2) measuring the test color in a smaller tube or cell; and/or 3) making the color measurement at 625 nm. The percent inhibition for a given test is determined by:

$$\frac{(\text{mg/l } PO_4 \text{ in inhibitor treated flask}) - (\text{mg/l } PO_4 \text{ in control flask})}{(\text{mg/l } PO_4 \text{ theoretical (9 mg/l)}) - (\text{mg/l } PO_4 \text{ in control flask})} \times 100 = \% \text{ inhibition}$$

TABLE I

| | Composition (Wt. %) | | [n] | CaCO$_3$ | CaPO$_4$ | | | | |
|---|---|---|---|---|---|---|---|---|---|
| Examples | AA/AMPSA | AA/Methoxy Allyl PEG | (dl/g) | 1 ppm | 2 ppm | 4 ppm | 8 ppm | 10 ppm | 12 ppm |
| 1 | 60/40 | — | 0.1 | 70 | 78 | 80 | 100 | 100 | 100 |
| 2 | — | 60/40 | 0.2 | 96 | 100 | 100 | — | — | 35 |
| 3 | 50% 60/40 | 50% 60/40 | — | 76 | 84 | 93 | 100 | 100 | 99 |

The tendency of the polymer to cause coagulation and precipitation of iron oxide in the presence of calcium ion was also tested. The results are summarized in Table II.

TABLE II

Iron Oxide Dispersion in $Ca^{+2}$
(pH 8.2, 5 mg/l iron oxide, 5 mg/l polymer)

| Example | Polymer | Dosage | Max. $Ca^{+2}$ Tolerance Before Coagulation |
|---|---|---|---|
| 2 | AA/Methoxy AllylPEG 60/40 | 5 mg/l | 5 mmoles |
| 3 | AA/AMPSA 60/40 | 5 mg/l | 100 mmoles |
| 4 | AA/AMPSA/60/40 and AA/Methoxy AllylPEG 60/40 | 5 mg/l:5 mg/l | 300 mmoles |

These examples demonstrate the synergistic benefits of the instant compositions in the presence of calcium ions.

What is claimed is:

1. A process for inhibiting formation and deposition of iron oxide in an aqueous system containing calcium ions, comprising adding to said system 0.1 to 25 ppm of an admixture comprising:
(A) a water-soluble polymer having an intrinsic viscosity of 0.05 to 0.5 dl/g, prepared from:
  (i) 50 to 70%, by weight, of an unsaturated carboxylic acid, or its salt; and
  (ii) 30 to 50%, by weight, of an unsaturated sulfonic acid, or its salt; and
(B) a water-solubel polymer having an intrinsic viscosity of 0.05 to 0.5 dl/g prepared from:
  (i) 50 to 70%, by weight, of an unsaturated carboxylic acid or its salt; and
  (ii) 30 to 50%, by weight, of an unsaturated pendant polyalkylene oxide compound; wherein the ratio of (A):(B) is about 1:1, wherein said unsaturated carboxylic acid of (A) or (B) is selected from the group consisting of acrylic acid and methacrylic acid, wherein said unsaturated sulfonic acid is selected from the group consisting of 2-acrylamido-2-methylpropyl sulfonic acid and 2-methacrylamido-2-methylpropyl sulfonic acid, and wherein said unsaturated pendant polyalkylene oxide compound is methoxyallyl polyethylene glycol of the formula:

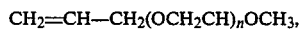

$CH_2=CH-CH_2(OCH_2CH)_nOCH_3$, wherein n ranges from 5–10.

* * * * *